(12) United States Patent
Do

(10) Patent No.: US 11,884,266 B2
(45) Date of Patent: Jan. 30, 2024

(54) METHOD AND SYSTEM FOR OBSTACLE AVOIDANCE, INVOLVING THE CONTROL OF STEERING AND DIFFERENTIAL BRAKING SYSTEMS

(71) Applicants: RENAULT s.a.s., Boulogne-Billancourt (FR); NISSAN MOTOR CO., LTD., Yokohama (JP)

(72) Inventor: Anh Lam Do, Antony (FR)

(73) Assignees: RENAULT s. a. s., Boulogne-Billancourt (FR); NISSAN MOTOR CO., LTD., Yokohama (JP)

( * ) Notice: Subject to any disclaimer, the term of this patent is extended or adjusted under 35 U.S.C. 154(b) by 215 days.

(21) Appl. No.: 17/292,556

(22) PCT Filed: Oct. 25, 2019

(86) PCT No.: PCT/EP2019/079121
§ 371 (c)(1),
(2) Date: May 10, 2021

(87) PCT Pub. No.: WO2020/099098
PCT Pub. Date: May 22, 2020

(65) Prior Publication Data
US 2022/0001860 A1 Jan. 6, 2022

(30) Foreign Application Priority Data
Nov. 13, 2018 (FR) ...................... 1860461

(51) Int. Cl.
*B60W 30/09* (2012.01)
*B60W 50/00* (2006.01)
*B60T 8/1755* (2006.01)

(52) U.S. Cl.
CPC ......... *B60W 30/09* (2013.01); *B60T 8/17558* (2013.01); *B60W 50/0097* (2013.01);
(Continued)

(58) Field of Classification Search
CPC ............ B60W 30/09; B60W 50/0097; B60W 2520/14; B60W 2520/20; B60W 2552/30;
(Continued)

(56) References Cited

U.S. PATENT DOCUMENTS

2004/0193351 A1* 9/2004 Takahashi ................. B60T 7/22
340/436
2004/0193374 A1* 9/2004 Hac ........................ G08G 1/166
701/301
(Continued)

FOREIGN PATENT DOCUMENTS

| EP | 3 056 404 A1 | 8/2016 |
| FR | 3 041 590 A1 | 3/2017 |

(Continued)

OTHER PUBLICATIONS

International Search Report dated Feb. 4, 2020 in PCT/EP2019/079121 filed on Oct. 25, 2019, 3 pages.

*Primary Examiner* — Kira Nguyen
(74) *Attorney, Agent, or Firm* — Oblon, McClelland, Maier & Neustadt, L.L.P.

(57) ABSTRACT

An obstacle-avoidance method includes detecting an obstacle in a vicinity of a motor vehicle and planning an obstacle-avoidance path for avoiding the obstacle; and commanding steering and differential braking systems to handle the avoidance path.

12 Claims, 3 Drawing Sheets

(52) U.S. Cl.
CPC .... *B60T 2201/022* (2013.01); *B60W 2520/14* (2013.01); *B60W 2520/20* (2013.01); *B60W 2552/30* (2020.02); *B60W 2710/18* (2013.01); *B60W 2710/202* (2013.01)

(58) Field of Classification Search
CPC ......... B60W 2710/18; B60W 2710/202; B60T 8/17558; B60T 2201/022
See application file for complete search history.

(56) References Cited

U.S. PATENT DOCUMENTS

| | | |
|---|---|---|
| 2011/0010054 A1 | 1/2011 | Wilson-Jones et al. |
| 2013/0211678 A1 | 8/2013 | Lee et al. |
| 2016/0264135 A1 | 9/2016 | Yamakado et al. |
| 2016/0264136 A1 | 9/2016 | Minoiu Enache |
| 2016/0311416 A1 | 10/2016 | Bretzigheimer et al. |
| 2017/0021829 A1* | 1/2017 | Nishimura ............... B62D 6/00 |
| 2018/0065623 A1* | 3/2018 | Wodrich ............... B60W 30/02 |
| 2018/0290686 A1 | 10/2018 | Minoiu Enache et al. |
| 2019/0210597 A1* | 7/2019 | Mukai ...................... G08G 1/16 |
| 2020/0086919 A1* | 3/2020 | Riikonen ............. B60W 30/09 |

FOREIGN PATENT DOCUMENTS

| | | |
|---|---|---|
| WO | WO 2008/071926 A1 | 6/2008 |
| WO | WO 2012/060555 A2 | 5/2012 |
| WO | WO 2015/071052 A1 | 5/2015 |

* cited by examiner

METHOD AND SYSTEM FOR OBSTACLE AVOIDANCE, INVOLVING THE CONTROL OF STEERING AND DIFFERENTIAL BRAKING SYSTEMS

TECHNICAL FIELD

The present invention relates to the field of motor vehicles and notably driver aid systems for preventing collisions.

Accidents caused by collisions, for example with another vehicle, a pedestrian or a cyclist, following emergency situations, represent a significant percentage of road traffic accidents.

It is known practice to use driving aid systems, for example the automatic emergency braking system known by its abbreviation AEB, to avoid collisions between the motor vehicle and an obstacle in the traffic lane of said vehicle, by using the conventional braking system. However, there are many situations that are not effectively dealt with by such an emergency braking system, particularly when the motor vehicle is running at a high speed. Specifically, it is not possible to avoid the collision or to brake when the motor vehicle is driving at high speed and there is another vehicle behind said vehicle. In such a situation, it is preferable to steer the wheels of the vehicle in order to effect a lateral-avoidance path.

Driving aid systems known as automatic evasive steering, abbreviated to AES, are known and make it possible to avoid collisions by activating a steering/differential braking system for a limited duration in order to avoid a collision with an obstacle. The obstacle may be in the same traffic lane as the motor vehicle or in an adjacent lane.

One of the objectives in designing a safe and reliable AES system is to create a high-performance optimal and robust controller capable of performing predefined avoidance paths. In the extreme case, this involves an automatic lane-change at a longitudinal speed that may be as high as 160 km/h.

The motor vehicle stability and controllability limits have a great impact on the ability of the AES controller to act. Specifically, the torque demanded by the AES controller of the electric power steering needs to be limited in amplitude and in gradient in order for a driver always to be able to take back manual control of the steering wheel. In addition, the vehicle dynamics, notably such as the drift angle, the yaw rate, need to be limited in order to avoid a loss of grip between tire and ground which could endanger the driver.

In order to get around these limits regarding the controllability and stability of the motor vehicle, it is known practice to combine the steering system with the differential braking system. Specifically, the steering system is particularly effective at moderate speeds, whereas the differential braking system improves the vehicle handling dynamics at high speeds. In addition, the combination of two actuators ensures good vehicle stability and, for example, makes it possible to reduce slip during an avoidance maneuver in a tight bend.

PRIOR ART

Reference may be made for example to document WO 2007 73 772-A1 which describes a system configured to control both the steering and the differential braking system in order to avoid the risk of vehicle oversteer. However, that document does not propose any dynamic model of the vehicle.

Reference may also be made to document FR 2 695 613-A1 which describes a method for automatically correcting the onset of a yawing movement of a motor vehicle of the road vehicle type by applying a braking torque to one or more wheels of the vehicle. That document does not propose an obstacle-avoidance method.

Also known are documents EP 1 790 542-A1 and KR 10 085 11 20 which relate to lane departure avoidance methods based solely on the system for the differential braking of the wheels. However, those documents do not address the problem of following the obstacle-avoidance path, nor that of the controllability and stability of the vehicle.

There is therefore a need to optimize the simultaneous control of the two, steering and differential braking, systems in a context of automatic obstacle avoidance in order to perform avoidance paths that take account of the controllability limits associated with the vehicle torque and the stability of the motor vehicle.

DESCRIPTION OF THE INVENTION

The object of the invention is therefore to propose a reliable and simple obstacle-avoidance system and method.

One subject of the present invention is an obstacle-avoidance method wherein:

an obstacle in the vicinity of a motor vehicle is detected and an obstacle-avoidance path for avoiding said obstacle is planned, and steering and/or differential braking systems configured to handle the avoidance path are commanded.

Advantageously, when the steering and/or differential braking systems are commanded, there is defined a controllability constraint during which the steering torque is limited in amplitude and in gradient and defines a stability constraint during which the slip and yaw rate of the vehicle are bounded.

For example, a check is performed to determine whether the controllability constraint is respected, and if said constraint is respected, only the steering of the wheels is commanded.

Specifically, in that case, steering the wheels is sufficient to perform the avoidance maneuver once the steering torque demanded is bounded by the controllability barriers. In this instance, the contribution from the differential braking is zero.

If, on the other hand, said constraint is not respected, the differential braking system is commanded.

For example, when the ratio between the lateral avoidance offset and the longitudinal avoidance distance is too great.

Differential braking needs to come into effect in this case in order to assist with the steering and correctly follow the avoidance path. Without the contribution of the differential braking, the path achieved would be incorrect and could endanger the motor vehicle.

The parameter $\alpha_{DB}$ is the only parameter to be controlled in order to manage the steering and differential braking system.

It is possible, for example, to postulate the following hypotheses:

the steering torque does not exceed the controllability limit in amplitude and in gradient, the avoidance path is predefined, the behavior of the differential braking is modeled by a yaw moment; and the curvature of the path is zero.

A second aspect of the invention relates to a module for controlling the steering and/or differential braking systems and configured to issue a wheel steering setpoint to a wheel-steering computer of a motor vehicle and a yaw moment setpoint to a braking computer of said motor vehicle.

Advantageously, the module comprises a closed-loop controller for the steering system configured to follow the reference avoidance path and responding to the vehicle stability constraint.

For example, the module further comprises a feedforward controller configured to compensate for the effect of the deviation of the path on the path following error.

The module may also comprise a closed-loop controller for the differential braking system configured to improve the performance of the steering loop, notably in the event of torque saturation and the stability of the vehicle.

A third aspect of the invention relates to an obstacle-avoidance system comprising an obstacle detection module detecting an obstacle in the vicinity of a motor vehicle and planning an obstacle-avoidance path for avoiding said obstacle, and a control module for controlling steering and/or differential braking systems as described hereinabove.

Another aspect of the invention relates to a motor vehicle comprising a system for locating the motor vehicle with respect to its traffic lane, such as, for example, a front-mounted camera and capable of determining the lateral offset with respect to the lane markings at a sighting distance and the relative heading angle of said vehicle, an obstacle detection system detecting obstacles in the path of the vehicle, for example a front-mounted radar, configured to determine the longitudinal distance and overlap of the obstacle with respect to said vehicle, a gyrometer, an automatic power steering, a control module controlling the steering and/or differential braking systems as described hereinabove, a computer configured to convert the steering angle setpoint from said control module into a torque limit for the power steering in order to perform the steering, a computer configured to convert the yaw moment setpoint from said control module into torques at the wheels in order to perform the differential braking, and a sensor measuring the angle and rate of turning of the steering wheel.

BRIEF DESCRIPTION OF THE DRAWINGS

Further objects, features and advantages of the invention will become apparent from reading the following description, given solely by way of nonlimiting example, and made with reference to the attached drawings in which:

FIG. 1 very schematically depicts an obstacle-avoidance maneuver by an obstacle-avoidance system 10.

Figure 1:
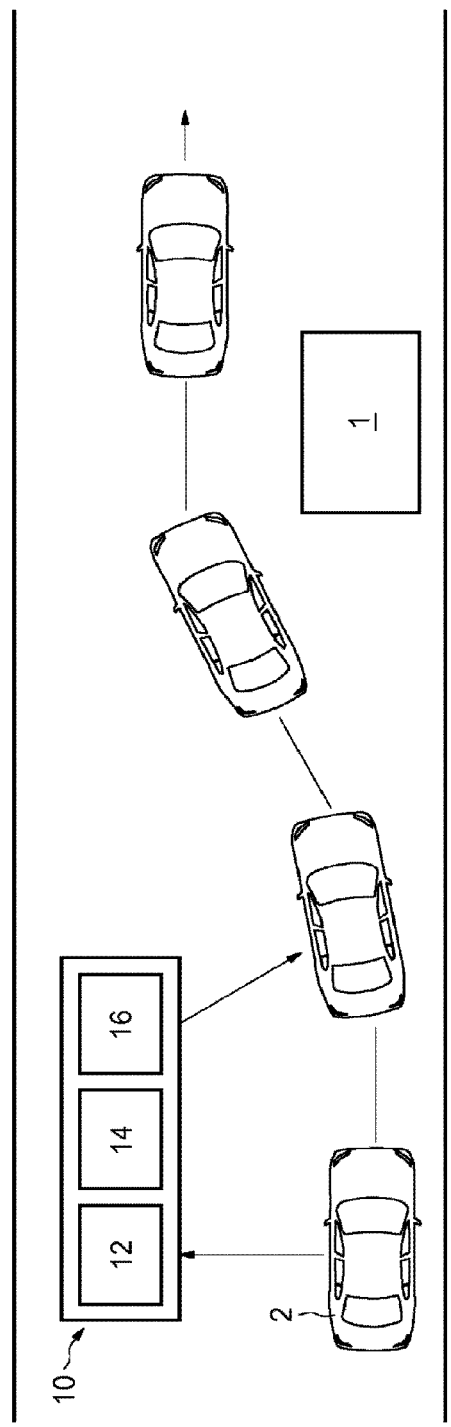
FIG. 1 schematically depicts an obstacle-avoidance maneuver by an obstacle-avoidance system comprising a control module controlling the steering (DAE) and/or differential braking systems and configured to manage the avoidance path according to the invention.

The obstacle-avoidance system 10 comprises an obstacle detection module 12 detecting an obstacle 1 in the vicinity of a motor vehicle 2 and planning an obstacle-avoidance path to avoid said obstacle, a control module controlling the steering (DAE) and/or differential braking systems configured to manage the avoidance path and a module 16 for stopping operation of the steering (DAE) and/or differential braking systems as soon as the motor vehicle is a predetermined distance from said obstacle 1.

The motor vehicle 2 comprises a system for locating the motor vehicle with respect to its traffic lane, such as, for example, a front-mounted camera, and capable of determining the lateral offset with respect to the lane markings at a sighting distance yL and the angle of relative heading of said vehicle ψL. The motor vehicle is also provided with an obstacle-detection system detecting obstacles in the path of the vehicle, for example a front-mounted radar, configured to determine the longitudinal distance and overlap of the obstacle with respect to said vehicle.

Figure 2:
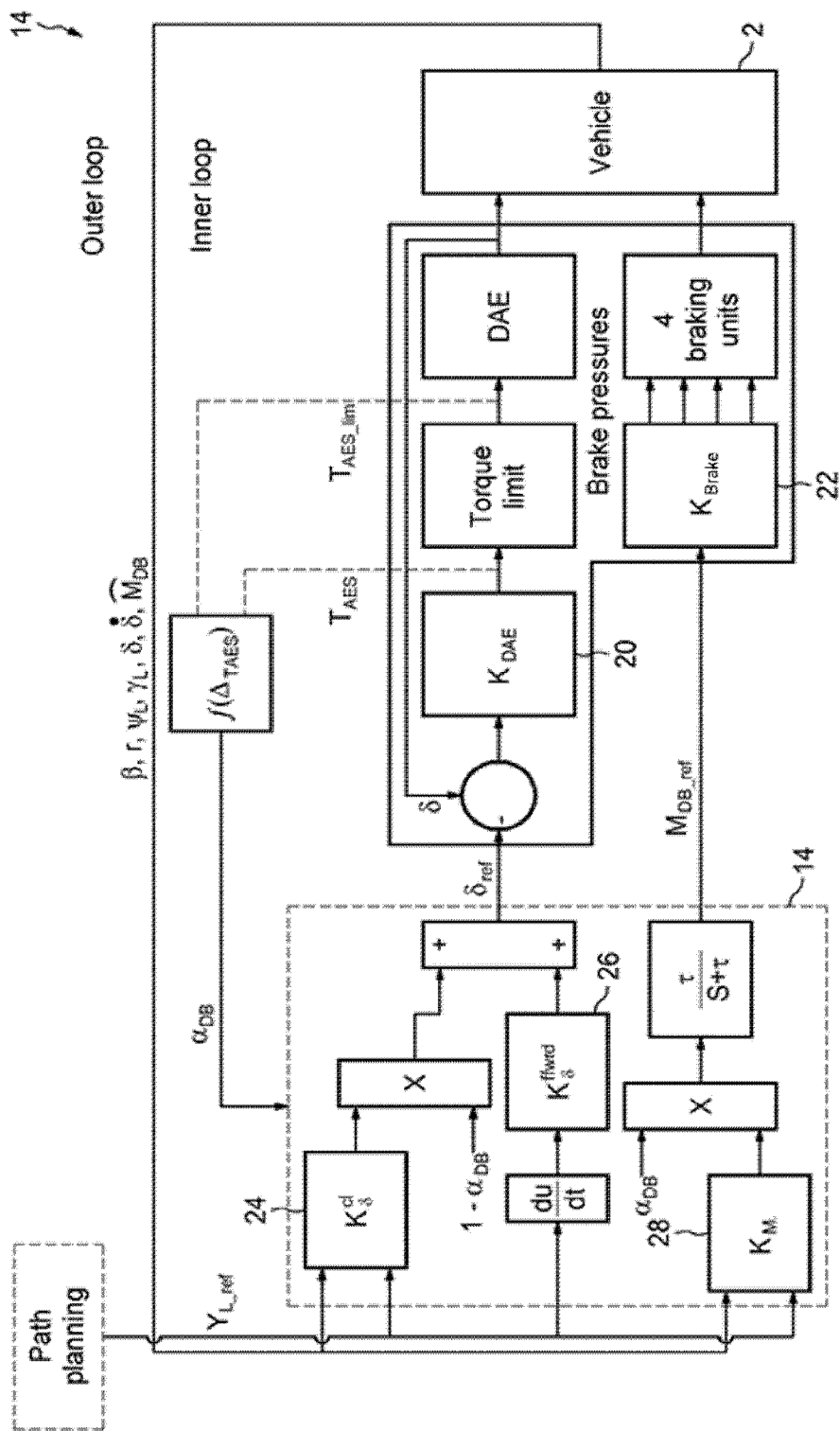
FIG. 2 schematically depicts the obstacle-avoidance system of FIG. 1.

As illustrated in FIG. 2, the motor vehicle 2 also comprises a gyrometer (not depicted), an automatic power steering DAE capable of performing the torque setpoint generated by the steering (DAE) and/or differential braking system control module 14, a computer 20 configured to convert the steering angle setpoint into a torque limit for the power steering DAE in order to perform the steering, a brake unit BRAKE UNIT capable of performing the torque setpoint generated by the steering (DAE) and/or differential braking system control module 14, a computer 22 configured to convert the yaw moment setpoint into torques at the wheels in order to perform the differential braking, and a sensor for measuring the angle and rate of turning of the steering wheel.

The steering (DAE) and/or differential braking systems control module 14 is configured to issue a wheel steering setpoint δref to the wheel steering computer and a yaw moment setpoint MDB_Ref to the computer 22.

The steering (DAE) and/or differential braking systems control module 14 comprises a closed-loop controller 24 for the steering system, configured to follow the reference avoidance path and responding to the vehicle stability constraint.

The steering (DAE) and/or differential braking systems control module 14 further comprises a feedforward controller 26 configured to compensate for the effect of the deviation of the path on the path-following error.

Finally, the steering (DAE) and/or differential braking systems control module 14 comprises a closed-loop controller 28 for the differential braking system and configured to improve the performance of the steering loop, notably in the event of torque saturation and the stability of the vehicle.

Figure 3:
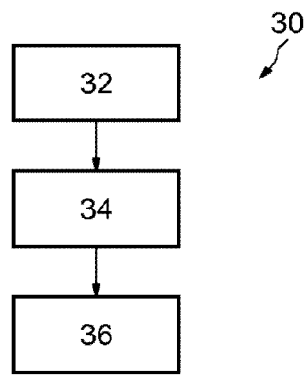
FIG. 3 illustrates a flow diagram of an obstacle-avoidance method implemented by the system of FIG. 1.

As illustrated in FIG. 3, the obstacle-avoidance method 30 comprises a step 32 of detecting an obstacle 1 in the vicinity of a motor vehicle 2 and of planning an obstacle-avoidance path for avoiding said obstacle, a step 34 of commanding the steering (DAE) and/or differential braking systems configured to manage the avoidance path and a step 36 of stopping operation of the steering (DAE) and/or differential braking systems as soon as the motor vehicle is a predetermined distance from said obstacle 1.

Figure 4:
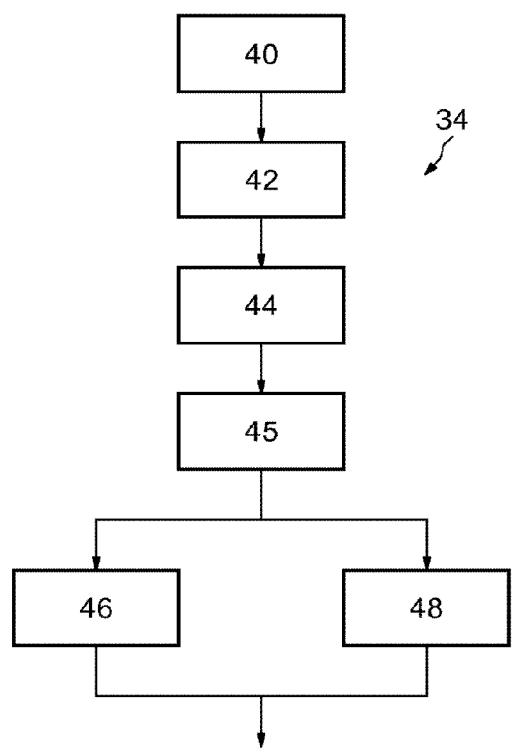
FIG. 4 illustrates details of the step of commanding the steering (DAE) and/or differential braking systems configured to manage the avoidance path.

FIG. 4 illustrates in detail the step 34 of commanding the steering (DAE) and/or differential braking systems configured to manage the avoidance path.

In order to model the dynamics of the motor vehicle controlled by the steering system and the differential braking system, the following hypotheses are made in step 40:

When the steering torque does not exceed the controllability limit in amplitude and in gradient, the behavior of the power steering is modeled by the following equation:

Where $$\begin{pmatrix}\ddot{\delta}\\\dot{\delta}\end{pmatrix} = \begin{bmatrix} -2\xi\omega & -\omega^2 \\ 1 & 0 \end{bmatrix}\begin{pmatrix}\dot{\delta}\\\delta\end{pmatrix} + \begin{pmatrix}\omega^2\\0\end{pmatrix}\delta_{ref} \qquad \text{[Math 1]}$$

Where:

δ is the angle between the front wheels and the longitudinal axis of the vehicle, expressed in rad; $\delta_{ref}$ is the setpoint angle for the front wheels, expressed in rad; and ξ and ω are two constants representing the characteristics of the actual angle of the front wheels.

Another hypothesis made is that the avoidance path is predetermined, that the behavior of the differential braking is modeled by a yawing moment. Specifically, this yawing moment is created by the braking units controlled by a computer carried on board the vehicle and which translates the yaw moment setpoint into braking torques applied to each wheel.

A final hypothesis made is that the curvature is assumed to be zero. If the curvature is nonzero, then a controller $K_\delta^{ffwrd}$, for example of the feedforward type, can easily be calculated to eliminate the effect of the curvature on the following of the path.

If the yawing moment by differential braking cannot be estimated, then the following equation is considered:

$$\begin{pmatrix}\dot\beta\\\dot r\\\dot\psi_L\\\dot y_L\\\ddot\delta\\\dot\delta\end{pmatrix}=\begin{bmatrix}-\frac{C_f+C_r}{mV} & 1+\frac{C_rl_r-C_fl_f}{mV^2} & 0 & 0 & 0 & \frac{C_f}{mV}\\-\frac{C_fl_f-C_rl_r}{J} & -\frac{C_rl_r^2+C_fl_f^2}{JV} & 0 & 0 & 0 & \frac{C_fl_f}{J}\\0 & 1 & 0 & 0 & 0 & 0\\V & l_s & V & 0 & 0 & 0\\0 & 0 & 0 & 0 & -2\xi\omega & -\omega^2\\0 & 0 & 0 & 0 & 1 & 0\end{bmatrix}\begin{pmatrix}\beta\\r\\\psi_L\\y_L\\\dot\delta\\\delta\end{pmatrix}+\begin{bmatrix}0\\0\\0\\0\\\omega^2\\0\end{bmatrix}(1-\alpha_{DB})\delta_{ref}+\begin{bmatrix}0\\\frac{1}{J}\\0\\0\\0\\0\end{bmatrix}\alpha_{DB}M_{DB}\quad\text{[Math 2]}$$

Where:

β is the drift angle, expressed in rad;

r is the yaw rate, expressed in rad/s; $y_L$ is the lateral offset between the axis of the vehicle and the tangent to the forward path of the vehicle, expressed in m;

$\psi_L$ is the relative heading angle between the axis of the vehicle and the tangent to the reference path, expressed in rad/s; and δ is the angle between the front wheels and the longitudinal axis of the vehicle, expressed in rad;

$c_f$ is the cornering stiffness of the front wheels, expressed in N/rad;

$c_r$ is the cornering stiffness of the front wheels, expressed in N/rad;

V is the speed of the vehicle along the longitudinal axis, expressed in m/s;

$M_{DB\_ref}$ is the yaw moment setpoint, expressed in N.m;

$\alpha_{DB}$ is the yaw angle, expressed in rad.

If the yaw moment through differential braking can be estimated, then the following equation is considered:

$$\begin{pmatrix}\dot\beta\\\dot r\\\dot\psi_L\\\dot y_L\\\ddot\delta\\\dot\delta\\\dot{\hat M}_{DB}\end{pmatrix}=\begin{bmatrix}-\frac{C_f+C_r}{mV} & 1+\frac{C_rl_r-C_fl_f}{mV^2} & 0 & 0 & 0 & \frac{C_f}{mV} & 0\\-\frac{C_fl_f-C_rl_r}{J} & -\frac{C_rl_r^2+C_fl_f^2}{JV} & 0 & 0 & 0 & \frac{C_fl_f}{J} & \frac{\alpha_{DB}}{J}\\0 & 1 & 0 & 0 & 0 & 0 & 0\\V & l_s & V & 0 & 0 & 0 & 0\\0 & 0 & 0 & 0 & -2\xi\omega & -\omega^2 & 0\\0 & 0 & 0 & 0 & 1 & 0 & 0\\0 & 0 & 0 & 0 & 0 & 0 & -\tau\end{bmatrix}\begin{pmatrix}\beta\\r\\\psi_L\\y_L\\\dot\delta\\\delta\\\hat M_{DB}\end{pmatrix}+\begin{bmatrix}0\\0\\0\\0\\\omega^2\\0\\0\end{bmatrix}(1-\alpha_{DB})\delta_{ref}+\begin{bmatrix}0\\0\\0\\0\\0\\0\\\tau\end{bmatrix}M_{DB\_ref}\quad\text{[Math 3]}$$

Where:

$\dot{\hat M}_{DB}$ is the yaw moment, expressed in N.m.

The dynamics of the differential braking system can be written according to the following equation:

$$\dot{\hat M}_{DB}=-\tau\hat M_{DB}+\tau M_{DB\_ref}\quad\text{[Math 4]}$$

Where:

$M_{DB\_ref}$ is the yaw moment setpoint, expressed in N.m; and $\hat M_{DB}$, is the yaw moment, expressed in N.m.

Thus, the yaw moment (rotation) and its dynamics are introduced into the control of the differential braking system. In addition, the introduction of the parameter $\alpha_{DD} \in [0,1]$ allows the actions of the steering and of the differential braking to be handled at the same time. When $\alpha_{DB}=0$, the differential braking is not needed; the steering alone is sufficient to follow the avoidance path. When $\alpha_{DB}=1$, the full capability of the differential braking will be of benefit in assisting the steering in achieving a dynamic avoidance maneuver. However, the use of 100% of the differential braking is not always necessary, and it is in these instances that α adopts values comprised between 0 and 1.

The step 34 of commanding the steering (DAE) and/or differential braking systems further comprises a step of defining a controllability constraint during which the torque TAES is limited in amplitude and gradient and a step 44 of defining a stability constraint during which the slip and yaw rate r of the vehicle are bounded.

The equation Math 3 can be rewritten as follows:

$$\begin{pmatrix} \dot{\beta} \\ \dot{r} \\ \dot{\psi}_L \\ \dot{e}_{yL} \\ \ddot{\delta} \\ \dot{\delta} \\ \dot{\hat{M}}_{DB} \end{pmatrix} = \begin{bmatrix} -\dfrac{C_f+C_r}{mV} & 1+\dfrac{C_r l_r - C_f l_f}{mV^2} & 0 & 0 & 0 & \dfrac{C_f}{mV} & 0 \\ -\dfrac{C_f l_f - C_r l_r}{J} & -\dfrac{C_r l_r^2 + C_f l_f^2}{JV} & 0 & 0 & 0 & \dfrac{C_f l_f}{J} & \dfrac{\alpha_{DB}}{J} \\ 0 & 1 & 0 & 0 & 0 & 0 & 0 \\ V & l_s & V & 0 & 0 & 0 & 0 \\ 0 & 0 & 0 & 0 & -2\xi\omega & -\omega^2 & 0 \\ 0 & 0 & 0 & 0 & 1 & 0 & 0 \\ 0 & 0 & 0 & 0 & 0 & 0 & -\tau \end{bmatrix} \begin{pmatrix} \beta \\ r \\ \psi_L \\ e_{yL} \\ \dot{\delta} \\ \delta \\ \hat{M}_{DB} \end{pmatrix} + \begin{bmatrix} 0 \\ 0 \\ 0 \\ 0 \\ \omega^2 \\ 0 \\ 0 \end{bmatrix}(1-\alpha_{DB})\delta_{ref} + \begin{bmatrix} 0 \\ 0 \\ 0 \\ 0 \\ 0 \\ 0 \\ \tau \end{bmatrix} M_{DB\_ref} + \begin{bmatrix} 0 \\ 0 \\ 0 \\ -1 \\ 0 \\ 0 \\ 0 \end{bmatrix} \dot{y}_{L\_ref}$$

[Math 5]

Where:

$$e_{yL} = y_L - y_{L_{ref}}$$

[Math 6]

The equation Math 4 can be written in the form of a system of variable linear parameters, as follows:

$$\dot{x} = A(\alpha_{DB})x + B_\delta(1-\alpha_{DB})\delta_{ref} + B_M M_{DB\_ref} + B_y \dot{y}_{L\_ref}$$

[Math 7]

Where:

$$x = \begin{pmatrix} \beta \\ r \\ \psi_L \\ e_{yL} \\ \dot{\delta} \\ \delta \\ \hat{M}_{DB} \end{pmatrix}, \quad B_\delta = \begin{bmatrix} 0 \\ 0 \\ 0 \\ 0 \\ \omega^2 \\ 0 \\ 0 \end{bmatrix}, \quad B_M = \begin{bmatrix} 0 \\ 0 \\ 0 \\ 0 \\ 0 \\ 0 \\ \tau \end{bmatrix}, \quad B_y = \begin{bmatrix} 0 \\ 0 \\ 0 \\ -1 \\ 0 \\ 0 \\ 0 \end{bmatrix}$$

[Math 8]

$$A(\alpha_{DB}) = \begin{bmatrix} -\dfrac{C_f+C_r}{mV} & 1+\dfrac{C_r l_r - C_f l_f}{mV^2} & 0 & 0 & 0 & \dfrac{C_f}{mV} & 0 \\ -\dfrac{C_f l_f - C_r l_r}{J} & -\dfrac{C_r l_r^2 + C_f l_f^2}{JV} & 0 & 0 & 0 & \dfrac{C_f l_f}{J} & \dfrac{\alpha_{DB}}{J} \\ 0 & 1 & 0 & 0 & 0 & 0 & 0 \\ V & l_s & V & 0 & 0 & 0 & 0 \\ 0 & 0 & 0 & 0 & -2\xi\omega & -\omega^2 & 0 \\ 0 & 0 & 0 & 0 & 1 & 0 & 0 \\ 0 & 0 & 0 & 0 & 0 & 0 & -\tau \end{bmatrix}$$

Step 34 of commanding the steering (DAE) and/or differential braking systems further comprises a step 45 of verifying whether the controllability constraint is or is not or is no longer being respected and a step of commanding the steering system in instances in which the controllability constraint is being respected. The steering of the wheels alone is sufficient to effect the avoidance maneuver once the steering torque demanded is bounded by the controllability barriers. The contribution of the differential braking is zero in this instance.

In this case, the following model is considered for synthesizing the control law:

$$\begin{pmatrix} \dot{\beta} \\ \dot{r} \\ \dot{\psi}_L \\ \dot{e}_{yL} \\ \ddot{\delta} \\ \dot{\delta} \end{pmatrix} = \begin{bmatrix} -\dfrac{C_f+C_r}{mV} & 1+\dfrac{C_r l_r - C_f l_f}{mV^2} & 0 & 0 & 0 & \dfrac{C_f}{mV} \\ -\dfrac{C_f l_f - C_r l_r}{J} & -\dfrac{C_r l_r^2 + C_f l_f^2}{JV} & 0 & 0 & 0 & \dfrac{C_f l_f}{J} \\ 0 & 1 & 0 & 0 & 0 & 0 \\ V & l_s & V & 0 & 0 & 0 \\ 0 & 0 & 0 & 0 & -2\xi\omega & -\omega^2 \\ 0 & 0 & 0 & 0 & 1 & 0 \end{bmatrix} \begin{pmatrix} \beta \\ r \\ \psi_L \\ e_{yL} \\ \dot{\delta} \\ \delta \end{pmatrix} + \begin{bmatrix} 0 \\ 0 \\ 0 \\ 0 \\ \omega^2 \\ 0 \end{bmatrix} \delta_{ref} + \begin{bmatrix} 0 \\ 0 \\ 0 \\ -1 \\ 0 \\ 0 \end{bmatrix} \dot{y}_{L\_ref}$$

[Math 9]

Where:

$\alpha_{DB} 0.$

Equation Math 9 can be written according to the following equation:

$$\dot{\bar{x}} = \bar{A}\bar{x} + \bar{B}_\delta \delta_{ref} + \bar{B}_y \dot{y}_{L\_ref} \qquad \text{[Math 10]}$$

Where:

$$\bar{x} = \begin{pmatrix} \beta \\ r \\ \psi_L \\ e_{yL} \\ \delta \\ \dot{\delta} \end{pmatrix} \qquad \text{[Math 11]}$$

$$\bar{A} = \begin{bmatrix} -\dfrac{C_f + C_r}{mV} & 1 + \dfrac{C_r l_r - C_f l_f}{mV^2} & 0 & 0 & 0 & \dfrac{C_f}{mV} \\ -\dfrac{C_f l_f - C_r l_r}{J} & -\dfrac{C_r l_r^2 + C_f l_f^2}{JV} & 0 & 0 & 0 & \dfrac{C_f l_f}{J} \\ 0 & 1 & 0 & 0 & 0 & 0 \\ V & l_s & V & 0 & 0 & 0 \\ 0 & 0 & 0 & 0 & -2\xi\omega & -\omega^2 \\ 0 & 0 & 0 & 0 & 1 & 0 \end{bmatrix} \qquad \text{[Math 12]}$$

$$\bar{B}_\delta = \begin{bmatrix} 0 \\ 0 \\ 0 \\ 0 \\ \omega^2 \\ 0 \end{bmatrix} \qquad \text{[Math 13]}$$

$$\bar{B}_y = \begin{bmatrix} 0 \\ 0 \\ 0 \\ -1 \\ 0 \\ 0 \end{bmatrix} \qquad \text{[Math 14]}$$

$$\delta_{ref} = K_\delta^{cl} \bar{x} + K_\delta^{ffwrd} \qquad \text{[Math 15]}$$

$$\dot{\bar{x}} = \bar{A}\bar{x} + \bar{B}_\delta \delta_{ref} \qquad \text{[Math 16]}$$

The gain $K_\delta^{cl}$ can be calculated using the following equation:

$$K_\delta^{cl} = [k_1, k_2\ k_3\ k_4\ k_5\ k_6] \qquad \text{[Math 17]}$$

Substituting $\delta_{ref} = K_\delta^{cl}\bar{x} + K_\delta^{ffwrd}$ in equation Math 10 yields a closed-loop system:

$$\dot{\bar{x}} = (\bar{A} + \bar{B}_\delta K_\delta^{cl})\bar{x} + \bar{B}_\delta K_\delta^{ffwrd} + \bar{B}_y \dot{y}_{L\_ref} \qquad \text{[Math 18]}$$

The feedforward $k_\delta^{ffwrd}$ is calculated to reduce the error $e_{yL}$ to zero in the steady state (correct following of the path in the steady state):

$$\bar{x}(4) = -(\bar{A} + \bar{B}_\delta K_\delta^{cl})^{-1} (\bar{B}_\delta K_\delta^{ffwrd} + \bar{B}_y \dot{y}_{L\_ref})$$
$$[0\ 0\ 0\ 1\ 0\ 0] = 0 \qquad \text{[Math 19]}$$

Solving equation Math 19 gives:

$$K_\delta^{ffwrd} = -\dfrac{\dot{y}_{L\_ref}}{v} k_3 \qquad \text{[Math 20]}$$

Step 34 of commanding the steering (DAE) and/or differential braking systems further comprises a step of commanding the differential braking system in instances in which the controllability constraint is not or is no longer being respected. For example, when the ratio between the lateral avoidance offset and the longitudinal avoidance distance is too great.

The differential braking needs to contribute in this case to assisting the steering and correctly following the avoidance path. Without the contribution of the differential braking, the path followed would be incorrect and could endanger the motor vehicle.

The parameter $\alpha_{DB}$ is the only parameter to be controlled in order to manage the steering and differential braking system.

The parameter $\alpha_{DB}$ is calculated using the following equation:

$$\alpha_{DB} = f(\Delta_{T_{AES}}) = \qquad \text{[Math 21]}$$
$$\begin{cases} 0 \text{ when } T_{AES} \text{ is not saturated } (|T_{AES\_lim}| = |T_{AES}|) \\ 1 \text{ when } T_{AES} \text{ is highly saturated } (|T_{AES\_lim}| \ll |T_{AES}|) \in \\ \quad (0, 1) \text{ elsewhere } (|T_{AES\_lim}| < |T_{AES}|) \end{cases}$$

$\Delta_{T_{AES}}$ is calculated as follows:

$$\Delta_{T_{AES}} = d_a |T_{AES} - T_{AES\_int}| + d_s |T_{AES\_int} - T_{AES\_lim}| \qquad \text{[Math 22]}$$

Where $d_a \geq 0$, $d_s \geq 0$ are weighting parameters (to be selected during the development phase). For example, if $d_s \geq d_a$, then the gradient saturation carries more weight than the amplitude saturation in the differential braking demand, and vice versa.

Finally, the function $f(\Delta_{T_{AES}})$ is selected as being an activation function of sigmoid type:

$$f(\Delta_{T_{AES}}) = \frac{1}{1 + e^{-a_0(\Delta_{T_{AES}} - \Delta_0)}} \quad \text{[Math 23]}$$

$a_o > 0$ and $A_o 0$ are two parameters to be selected during on-vehicle development in order to achieve desired vehicle behaviors. With ($a_0=4$, $\Delta_o=2$) the differential braking reacts less quickly (on saturation of the steering by the controllability constraint) than with ($a_o=4$, $\Delta_o=1$).

Making the assumption that:

$$\delta_{ref} = K_\delta^{cl} \bar{x} + K_\delta^{ffwrd} \quad \text{[Math 24]}$$

together with the fact that the feed-forward gain $K_\delta^{ffwrd}$ is able to eliminate the impact of $\dot{y}_{L\_ref}$ on the path-following error in the steady state, equation [Math 7] can be written:

$$\dot{x} = (A(\alpha_{DB}) + (1-\alpha_{DB})B_\delta K_\delta^{cl})x + B_M M_{DB_{ref}} \quad \text{[Math 7a]}$$

The last objective is to find the following static state return control law:

$$M_{DB\_ref} = K_M x \quad \text{[Math 25]}$$

To do this, consider the following generic system:

$$\dot{x}_s = A_s(\theta)x_s + B_s u_s \quad \text{[Math 26]}$$

Where:
$x_s$ is the state vector;
$u_s$ is the control input;
$A_s$ and $B_s$ are matrices of appropriate dimensions; and $\theta$ is the vector of known and bounded exogenous parameters in an $X_\theta$ polytope of $2^N\theta$ ends.

$$X_\theta = \{\theta_{i\_min} \leq \theta_i \leq \theta_{i\_max}, i=1:N_\theta\} \quad \text{[Math 27]}$$

Consider a controller based on static state return of the form:

$$u_s = K_s x_s \quad \text{[Math 28]}$$

Some states need to be bounded. That condition is represented by the following equations:

$$X_0 = \{x \in R^n : |H_{0j}x| \leq h_{0j}, j=1:N_{X_0}, \forall \theta\} \quad \text{[Math 29]}$$

Where:
$N_{X_0}$ is the number of bounded states, $h_{0j}$ is a positive and known constant, $H_{0j}$ is a vector which selects the state concerned.

This criterion is used to ensure the stability of the vehicle during an emergency (dynamic) maneuver. The stability constraint is guaranteed by applying the following inequalities:

$$|[0\ 1\ 0\ 0\ 0\ 0\ 0]x| \leq r_{max} \quad \text{[Math 30]}$$

$$|[1\ 0\ 0\ 0\ 0\ 0\ 0]x| \leq \beta_{max} \quad \text{[Math 31]}$$

The poles of the closed-loop system need to be bounded in a zone defined by a radius $\gamma$, a minimum distance with respect to the imaginary axis $\mu$, an angle of opening $\varphi$. This criterion is used in order to have control setpoints that are reasonable and achievable by the actuators.

In order to respond to the criterion regarding the bounded states, the following conditions need to be satisfied.

$$\begin{bmatrix} P & * \\ H_{0i} & h_{0i}^2 \end{bmatrix} \succeq 0, i = 1, \ldots, N_{x_1} \quad \text{[Math 32]}$$

In order to respond to the criterion regarding the poles of the closed loop, the following LMI conditions need to be satisfied:

$$A_k Q + BR + (A_k Q + BR)^T + 2\mu Q \prec 0 : R = KP^{-1} \text{ where } k = 1:2^{N_\theta} \quad \text{[Math 33]}$$

$$\begin{bmatrix} -\gamma Q & A_k Q + BR \\ * & -\gamma Q \end{bmatrix} \prec 0 \text{ where } k = 1:2^{N_\theta} \quad \text{[Math 34]}$$

$$\begin{bmatrix} \sin(\varphi)(\overline{A}_k Q + BR + (A_k Q + BR)^T) & \cos(A_k Q + BR - (A_k Q + BR)^T) \\ * & \sin(\varphi)(A_k Q + BR + (A_k Q + BR)^T) \end{bmatrix} \prec 0 \quad \text{[Math 35]}$$

where $k = 1:2^{N_\theta}$

In the above equations, $A_k$ is the $A_s(\theta)$ matrix calculated at the $k^{th}$ end of the $X_\theta$ polytope.

Once equations 31 to 35 have been solved, this gives the value of the static state return vector K to be applied to the control law for the steering and differential braking systems.

By virtue of the invention, the automatic calculation of the gains K for the controllers makes it possible to reduce the design time for the steering and braking systems control method. The two-step steering and differential braking control method allows for traceability and therefore makes development easier. Specifically, the step of commanding the steering is performed to meet a need in nominal cases. The step of commanding the differential braking is then performed for special cases (saturation of torques, etc.).

In addition, the management of the steering and differential braking systems while at the same time respecting the controllability and stability constraint is simple, with the use of just one parameter $\alpha_{DB}$.

Throughout the present application, the curvature obviously corresponds to the curvature of the road, the invention being able to be applied whatever the curvature and when the curvature is non-zero, the controller $K_\delta^{ffwrd}$, for example of the feed-forward type, allows the effect of the curvature on the following of the path to be eliminated.

The invention claimed is:
1. An obstacle-avoidance method, comprising:
    detecting an obstacle in a vicinity of a motor vehicle and planning an obstacle-avoidance path for avoiding said obstacle; and
    commanding steering and differential braking systems configured to handle the avoidance path,
    wherein, when the steering and differential braking systems are commanded, there is defined a controllability constraint during which a steering torque is limited in amplitude and in gradient and defines a stability constraint during which a slip rate and a yaw rate of the vehicle are bounded.
2. The method as claimed in claim 1, wherein a check is performed to determine whether the controllability con- straint is respected, and when said constraint is respected, only the steering of the wheels is commanded.

3. The method as claimed in claim 2, wherein, when said constraint is not respected, the differential braking system is commanded.

4. The method as claimed in claim 1, wherein the following hypotheses are postulated:
the steering torque does not exceed a controllability limit in amplitude and in gradient,
the avoidance path is predefined,
the behavior of the differential braking is modeled by a yaw moment; and
the curvature of the road is zero.

5. A module configured to control steering and differential braking systems and configured to issue a wheel steering setpoint to a wheel-steering computer of a motor vehicle and a yaw moment setpoint to a braking computer of said motor vehicle, wherein the module is configured to define a controllability constraint during which a steering torque is limited in amplitude and in gradient and define a vehicle stability constraint during which a slip rate and a yaw rate of the vehicle are bounded.

6. The module as claimed in claim 5, further comprising a closed-loop controller for the steering system configured to follow a reference avoidance path and responding to the vehicle stability constraint.

7. The module as claimed in claim 5, further comprising a feedforward controller configured to compensate for an effect of a deviation of a path on a path following error.

8. The module as claimed in claim 5, further comprising a closed-loop controller for the differential braking system configured to improve performance of a steering loop and a stability of the vehicle.

9. An obstacle-avoidance system, comprising:
an obstacle detection module configured to detect an obstacle in a vicinity of a motor vehicle and plan an obstacle-avoidance path for avoiding said obstacle, and
the module configured to control the steering and differential braking systems as claimed in claim 5.

10. The obstacle-avoidance system according to claim 9, wherein the obstacle detection module is a radar.

11. A motor vehicle, comprising:
a system configured to locate a motor vehicle with respect to its traffic lane and to determine a lateral offset with respect to lane markings at a sighting distance and a relative heading angle of said vehicle;
an obstacle detection system configured to detect obstacles in a path of the vehicle and configured to determine a longitudinal distance and overlap of the obstacle with respect to said vehicle,
a gyrometer,
an automatic power steering,
the control module configured to control the steering and differential braking systems as claimed in claim 5,
a computer configured to convert said steering setpoint from said control module into a torque limit for the power steering in order to perform steering,
a computer configured to convert a yaw moment setpoint from said control module into torques at wheels of the vehicle in order to perform differential braking, and
a sensor measuring an angle and a rate of turning of a steering wheel of the vehicle.

12. An obstacle-avoidance method, comprising:
detecting an obstacle in a vicinity of a motor vehicle and planning an obstacle-avoidance path for avoiding said obstacle; and
commanding steering and differential braking systems configured to handle the avoidance path,
wherein the following hypotheses are postulated:
the steering torque does not exceed a controllability limit in amplitude and in gradient,
the avoidance path is predefined,
the behavior of the differential braking is modeled by a yaw moment; and
the curvature of the road is zero.

* * * * *